(12) United States Patent
Ji et al.

(10) Patent No.: US 11,905,672 B2
(45) Date of Patent: Feb. 20, 2024

(54) SEA SURFACE OIL RECOVERY DEVICE

(71) Applicant: CHANGZHOU UNIVERSITY, Jiangsu (CN)

(72) Inventors: Hong Ji, Changzhou (CN); Yinhan Zhao, Changzhou (CN); Ke Yang, Changzhou (CN); Zhixiang Xing, Changzhou (CN); Juncheng Jiang, Changzhou (CN); Jie Guo, Changzhou (CN); Ting Wang, Changzhou (CN); Yuchen Liu, Changzhou (CN); Renjie Lu, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 0 days.

(21) Appl. No.: 18/173,744

(22) Filed: Feb. 23, 2023

(65) Prior Publication Data

US 2023/0313477 A1    Oct. 5, 2023

Related U.S. Application Data

(63) Continuation-in-part of application No. PCT/CN2022/120052, filed on Sep. 21, 2022.

(30) Foreign Application Priority Data

Apr. 2, 2022 (CN) .......................... 202210342665.5

(51) Int. Cl.
*E02B 15/04* (2006.01)
*E02B 15/10* (2006.01)

(52) U.S. Cl.
CPC .......... *E02B 15/048* (2013.01); *E02B 15/046* (2013.01); *E02B 15/10* (2013.01)

(58) Field of Classification Search
CPC ...... E02B 15/046; E02B 15/048; E02B 15/10; E02B 15/106; C02F 1/40; C02F 2201/002; C02F 2101/32
(Continued)

(56) References Cited

U.S. PATENT DOCUMENTS

2017/0210643 A1    7/2017 Sato et al.

FOREIGN PATENT DOCUMENTS

| CN | 110496418 A | 11/2019 |
|---|---|---|
| CN | 214880673 U | 11/2021 |

(Continued)

OTHER PUBLICATIONS

Notification to Grant Patent Right for Invention in Chinese Application No. 202210342665.5 dated Jul. 20, 2023, 4 pages.

(Continued)

*Primary Examiner* — Claire A Norris
(74) *Attorney, Agent, or Firm* — METIS IP LLC

(57) ABSTRACT

A sea surface oil recovery device is provided, which comprises a storage cabin, an oil-water separation system and an oil-water collection system arranged on the storage cabin. The storage cabin is provided with an oil storage cabin, a water storage cabin, a separation cabin and a gas storage cabin which are separated from each other, and the storage cabin is provided with a water pipe for connecting the water storage cabin with the outside of the storage cabin. The oil-water separation system comprises a molecular semipermeable membrane for separating oil and water and a water suction pipe, wherein the molecular semipermeable membrane is arranged between the separation cabin and the water storage tank and connects the separation cabin with the water storage tank; the water suction pipe is arranged between the oil storage cabin and the separation cabin and connects the oil storage tank with each other.

5 Claims, 6 Drawing Sheets

(58) Field of Classification Search
USPC .............................. 210/242.1, 242.4, 242.3
See application file for complete search history.

(56) References Cited

FOREIGN PATENT DOCUMENTS

| | | |
|---|---|---|
| CN | 113800596 A | 12/2021 |
| CN | 215403578 U | 1/2022 |
| CN | 216073260 U | 3/2022 |
| CN | 114735788 A | 7/2022 |
| JP | H081154 A | 1/1996 |

OTHER PUBLICATIONS

Decision of Rejection in Chinese Application No. 202210342665.5 dated Mar. 1, 2023, 14 pages.

US 11,905,672 B2

SEA SURFACE OIL RECOVERY DEVICE

CROSS-REFERENCE TO RELATED DISCLOSURES

This application is a Continuation-in-part of International Application No. PCT/CN2022/120052 filed on Sep. 21, 2022, which claims the priority of the Chinese application No. 202210342665.5 filed on Apr. 2, 2022, the entire content of which is incorporated herein by reference.

TECHNICAL FIELD

The present disclosure relates to the technical field of sea surface oil recovery technology, and in particular to a sea surface oil recovery device.

BACKGROUND

Oil and its products during the process of exploitation, refining, storage, transportation and use may enter into the marine environment, causing pollution, and even ecological damage. Oil entering the sea forms blocky or banded oil films under various factors, and the oil films drift and spread with the wind, causing some difficulties in the recovery of sea surface oils.

Therefore, there is a need for a sea surface oil recovery device, which can properly process the leaked oil on the sea surface, improve marine pollution, reduce the loss of resources, protect the marine ecological environment, etc.

SUMMARY

One of the embodiments of the present disclosure provides a sea surface oil recovery device, comprising a storage cabin, an oil-water separation system, and an oil-water collection system arranged on the storage cabin; the storage cabin is provided with an oil storage cabin, a water storage cabin, a separation cabin and a gas storage cabin which are separated from each other, and the storage cabin is provided with a water pipe for connecting the water storage cabin with the outside of the storage cabin; the oil-water separation system includes a molecular semipermeable membrane for separating oil and water and a water suction pipe, the molecular semipermeable membrane is arranged between the separation cabin and the water storage cabin, and connects the separation cabin with the water storage cabin, and a pressure reducing valve is arranged on the top of the storage cabin and connected to the oil storage cabin; the oil-water collection system comprises a first water pump arranged on the storage cabin, an input end of the first water pump is arranged outside the storage cabin and at a sea level, an output end of the first water pump is connected to the separation cabin.

In some embodiments, the sea surface oil recovery device further comprises a power system, which includes a second water pump arranged on the storage cabin, wherein an input end of the second water pump is connected to the water storage cabin, and an output end of the second water pump is connected to the water pipe, and the other end of the water pipe is arranged outside the storage cabin.

In some embodiments, the power system further comprises a rudder hinged on the storage cabin, and the storage cabin is provided with a control mechanism for controlling the deflection of the rudder.

In some embodiments, the gas storage cabin is located above the storage cabin, the separation cabin is located below the oil storage cabin, and the separation cabin is located above the water storage cabin.

In some embodiments, a one-way valve for preventing an oil-water mixture in the separation cabin from flowing backward is arranged between the first water pump and the separation cabin.

In some embodiments, a water-absorbing material is arranged in the water suction pipe.

In some embodiments, the water-absorbing material is polyacrylamide.

In some embodiments, one end of the water suction pipe is spirally arranged in the oil storage cabin.

In some embodiments, a liquid level sensor is arranged in the oil storage cabin.

In some embodiments, the sea surface oil recovery device further comprising a cover, wherein the cover is arranged outside the storage cabin through a plurality of connecting mechanisms, and is located above the storage cabin to cover the storage cabin.

In some embodiments, the connecting mechanisms comprise a plurality of movably connecting rods with adjustable lengths; the cover is connected with the storage cabin through the plurality of connecting mechanisms, and a covering area of the cover is adjusted by synchronously adjusting the plurality of connecting mechanisms.

In some embodiments, blowing devices for gathering oil on a sea surface are arranged below the cover.

In some embodiments, a top end of the cover is provided with an image collector for obtaining a sea surface image.

In some embodiments, the sea surface oil recovery device further comprises a control mechanism; wherein the control mechanism comprises a controller and configured to determine a parameter of the connecting mechanism, blowing parameters of the blowing devices, and an operating power of the second water pump.

In some embodiments, the controller is in communication connection with the image collector, and the controller is configured to determine an oil distribution parameter of the sea surface through the sea surface image obtained by the image collector and determine the parameter of the connecting mechanism based on the oil distribution parameter.

In some embodiments, the controller is further configured to output the oil distribution parameter by recognizing the sea surface image using a recognition model, the oil distribution parameter comprises an oil distribution diagram comprising nodes and edges, the nodes represent regions, the edges represent adjacent relations, values of the nodes represent areas, and values of the edges represent distances.

In some embodiments, the controller is in communication connection with the blowing devices; and the controller is configured to determine the blowing parameters of the blowing devices based on the oil distribution parameter and positions of the blowing devices.

In some embodiments, the controller is further configured to determine the blowing parameters through an aggregation model and multiple rounds of iteration; wherein at least one round of iteration includes: outputting an aggregation distribution diagram after a preset time by processing a plurality of blowing parameters determined in the last round of iteration and an aggregation distribution diagram output in the last round of iteration based on the aggregation model; and adjusting the plurality of blowing parameters in the last round of iteration based on a difference between the output aggregation distribution diagram after the preset time and the output aggregation distribution diagram in the last round of iteration; when a maximum aggregation area in the output aggregation distribution diagram after the preset time is larger than a preset threshold, the iteration ends.

In some embodiments, the aggregation distribution diagram is an oil distribution diagram corresponding to an oil aggregation situation during the operation of the blowing devices.

In some embodiments, the controller determines the operating power of the second water pump in the subsequent recovery process through the aggregation distribution diagram and the covering area of the cover when the sea surface oil recovery device completes the recovery at a certain recovery position

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
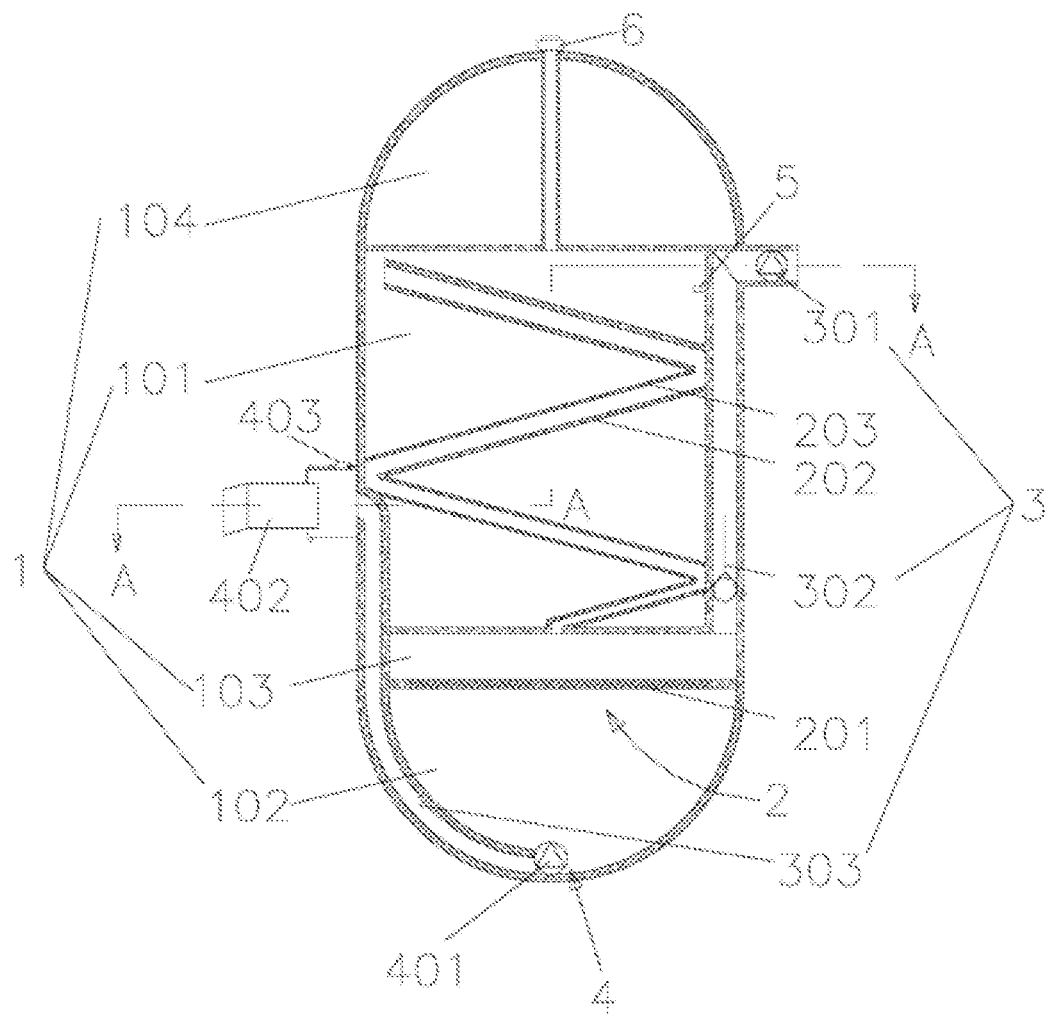
FIG. 1 is a front view of a sea surface oil recovery device according to some embodiments of the present disclosure.

The technical solutions of the present disclosure embodiments will be more clearly described below, and the accompanying drawings of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system", "device", "unit", and/or "module" used herein are one method to distinguish different components, elements, parts, sections, or assemblies of different levels in ascending order. However, the terms may be displaced by other expressions if they may achieve the same purpose As shown in the present disclosure and claims, unless the context clearly prompts the exception, "a", "an", "one", and/or "the" is not specifically the singular form, and the plural form may be included. It will be further understood that the terms "comprise," "comprises," and/or "comprising," "include," "includes," and/or "including," when used in the present disclosure, specify the presence of stated steps and elements, but do not preclude the presence or addition of one or more other steps and elements thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

Oil and its products during the process of exploitation, refining, storage, transportation, and use may enter into the marine environment, causing pollution. The oil that enters the sea first rapidly expands into a thin film on the ocean surface under the action of gravity, inertia, friction and surface tension, and then the thin film is divided into block or banded oil films of different sizes under the action of wind waves and currents, drifting with the wind diffusion. Wind is the most important factor affecting the drift of oil on the sea surface, and the drift speed of oil is about 3% of the wind speed. The oil drift found along the coast is more on the north coast of the peninsula in winter and more on the south coast of the peninsula in spring, which is also mainly caused by the wind. Non-hydrocarbon components such as nitrogen, sulfur, and oxygen in petroleum are surfactants, which can promote the diffusion of petroleum, which has further caused difficulties in the recovery of oil and its products on the sea surface.

In the process of crude oil extraction, the production water discharged into the sea by sea oil platforms often contains some crude oil, causing pollution to the marine environment and waste oil resources. Therefore, proper handling of oil on the sea surface plays a key role in decreasing marine pollution, reducing resource loss, and protecting the marine ecological environment. In order to solve the problem of pollution or damage to the marine ecological environment caused by oil floating on the ocean surface, some embodiments of this disclosure provide a sea surface oil recovery device.

Figure 2:
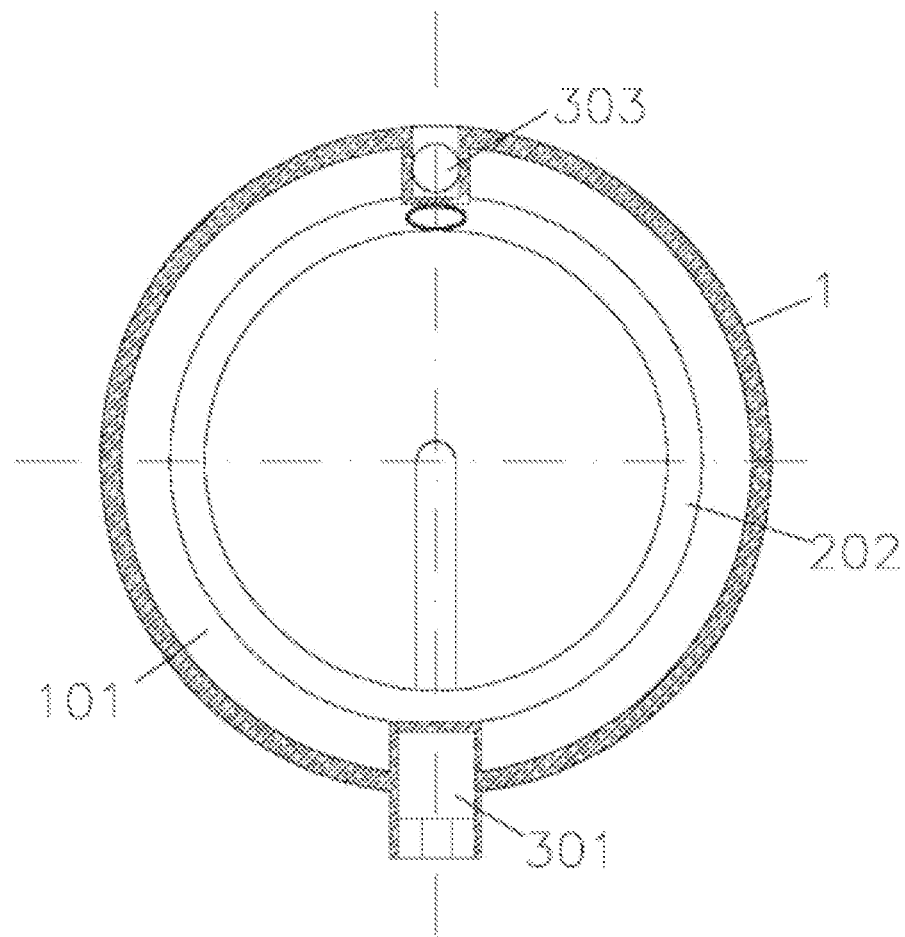
FIG. 2 is a cross-sectional view of the sea surface oil recovery device along the line AA of the front view in FIG. 1 according to some embodiments of the present disclosure.

FIG. 1 is a front view of a sea surface oil recovery device according to some embodiments of the present disclosure; FIG. 2 is a cross-sectional view of the sea surface oil recovery device along line A-A of the front view according to some embodiments of the present disclosure.

In some embodiments, as shown in FIG. 1 and FIG. 2, the sea surface oil recovery device may include a storage cabin 1, an oil-water separation system 2 and an oil-water collection system 3 arranged on the storage cabin 1. The storage cabin 1 is provided with an oil storage cabin 101, a water storage cabin 102, a separation cabin 103 and a gas storage cabin 104 which are separated from each other. The storage cabin 1 is provided with a water pipe 303 for communicating the water storage cabin 102 with the outside of the storage cabin 1. The oil-water separation system 2 includes a molecular semipermeable membrane 201 for separating oil and water and a water suction pipe 202, and the molecular semipermeable membrane 201 is arranged between the separation cabin 103 and the water storage cabin 102 and connects the separation cabin 103 with the water storage cabin 102, and the water suction pipe 202 is arranged between the oil storage cabin 101 and the separation cabin 103 and connects the oil storage cabin 101 and the separation cabin 103 with each other. A pressure reducing valve 6 is arranged on the top of the storage cabin 1, and connected to the oil storage cabin 101. The oil-water collection system 3 includes a first water pump 301 arranged on the storage cabin 1, an input end of the first water pump 301 is arranged outside the storage cabin 1 and located at a sea level, and an output end of the first water pump 301 is connected to the separation cabin 103.

The storage cabin 1 may refer to a device for collecting and processing the oil-water mixture on the sea surface. Storage cabin 1 may include a cabin wall and a compartment. For example, the cabin wall of the storage cabin 1 may be made of metal materials, inorganic non-metallic materials, polymer materials, and the like. In some embodiments, storage cabin 1 is provided with the oil storage cabin 101, the water storage cabin 102, the separation cabin 103 and the gas storage cabin 104, and a water pipe 303 for connecting the water storage cabin 102 with the outside of storage cabin 1.

The oil storage cabin 101 may refer to a device used to store the oil phase separated from the oil-water mixture on the sea surface. The oil storage cabin 101 may include a wall of the oil storage cabin 101 and a compartment of the oil storage cabin 101. For example, the oil storage cabin 101 may be a container made of ABS plastic, which has sufficient strength to withstand internal and external pressure and prevent leakage of the oil phase. In some embodiments, the oil storage cabin 101 is connected with the water suction pipe 202 and is used for storing the crudely-separated oil-water mixture flowing from the water suction pipe 202.

In some embodiments, the sea surface oil recovery device further includes a pressure reducing valve 6, which may be opened to evacuate the internal pressure when the oil storage cabin 101 reaches a certain pressure.

In some embodiments, a liquid level sensor 5 is provided in the oil storage cabin 101, and the liquid level sensor 5 may be used to monitor whether the liquid level of floating oil on the sea surface entering the oil storage cabin 101 is higher than a threshold value. For example, if the liquid level sensor 5 detects that the liquid level of floating oil on the sea surface entering the oil storage cabin 101 is higher than the threshold value, the first water pump 301 stops working, the sea surface oil recovery work is completed, and the sea surface oil recovery device (also referred to as recovery device for short) may be remotely controlled to a recovery point for recovery; if the liquid level sensor 5 detects that the liquid level of floating oil on the sea surface entering the oil storage cabin 101 is not higher than the threshold value, the first water pump 301 keeps working and continues to recover the oil on the sea surface.

The water storage cabin 102 may refer to a device for storing the crudely-separated water phase of the sea surface oil-water mixture. The water storage cabin 102 may include a wall and a compartment. For example, the water storage cabin 102 may be a container made of metal or plastic. In some embodiments, under the action of water and oil gravity, the water phase of the oil-water mixture in the separation cabin 103 may pass through the molecular semipermeable membrane 201 and enter the water storage cabin 102.

The separation cabin 103 may refer to a container used for a crude separation process of the oil-water mixture. The separation cabin 103 may include a wall and a compartment. For example, the separation cabin 103 may be a container made of aluminum alloy. In some embodiments, there may be an opening above the separation cabin 103 connecting with the water suction pipe 202. The first water pump 301 may continuously deliver the oil-water mixture on the sea surface to the separation cabin 103. Under the action of pressure, the crudely-separated oil-water mixture may enter the water suction pipe 202 through the small opening above the separation cabin 103, pass through the entire water suction pipe 202, flow out the top of the water suction pipe 202, and enter into the oil storage cabin 101.

The gas storage cabin 104 may refer to a device for storing gas to maintain sufficient buoyancy of the surface oil recovery device. The gas storage cabin 104 may include a wall, a compartment, and gas. For example, the gas storage cabin 104 may be a container made of synthetic rubber material, and the stored gas may be an inactive gas such as nitrogen or an inert gas such as helium. In some embodiments, the gas storage cabin 104 is in a sealed state, and may be arranged above the surface oil recovery device, without material exchange with various parts of the surface oil recovery device. In some embodiments, after the liquid level sensor 5 detects that the collected oil phase reaches a threshold value, the recovery device may stop the work of collecting the oil on the sea surface. At this time, the gas storage cabin 104 may play a role, and the gas stored in the gas storage cabin 104 can ensure that the sea surface oil recovery device still has enough buoyancy to prevent from sinking into the sea after collecting a large amount of oil and ensure that the first water pump 301 can absorb the oil-water mixture. In some embodiments, by arranging the gas storage cabin 104 on the top of the sea surface oil recovery device, the sea surface oil device can be prevented from sinking into the sea after the collection work is completed, facilitating the oil recovery.

In some embodiments, the gas storage cabin 104 is located above the storage cabin 1, the separation cabin 103 is located below the oil storage cabin 101, and the separation cabin 103 is located above the water storage cabin 102. In some embodiments, storage cabins for different materials located at different locations may be provided based on different properties of the materials. Based on the specific gravity of oil and water, the oil floats above the water, so the oil storage cabin 101 and the water storage cabin 102 are respectively arranged above and below the separation cabin 103 for oil-water separation. Gas has a lighter specific gravity than liquid, and the gas storage cabin 104 is arranged above the storage cabin 1.

The oil-water separation system 2 may refer to a device system for crude separation of oil-water mixed liquid. The oil-water separation system 2 may include the molecular semipermeable membrane 201, the water suction pipe 202, a water-absorbing material 203, and the like. In some embodiments, the oil-water separation system 2 may adopt gravity separation, centrifugal separation, electrical separation, adsorption separation, and other methods to crudely separate the oil-water mixture.

The molecular semipermeable membrane 201 may refer to a membrane that only allows certain molecules and ions to diffuse in and out. In some embodiments, the molecular semipermeable membrane 201 only allows water molecules to pass through, and oil substances cannot freely pass through the molecular semipermeable membrane 201. For example, the molecular semipermeable membrane 201 may be a cellulose acetate membrane, a polyamide membrane, a collodion semipermeable membrane, and the like. Specifically, the molecular semipermeable membrane 201 may be connected with a lower part of the separation cabin 103. After the oil-water mixture enters the separation cabin 103, due to the density, the oil phase covers the water phase. Under the action of gravity and the molecular semipermeable membrane 201, the lower water phase passes through the molecular semipermeable membrane 201 downwards and enter the water storage cabin 102, while the oil phase is intercepted by the molecular semipermeable membrane 201.

The water suction pipe 202 may refer to a pipe for transporting the crudely-separated oil-water mixture in the separation cabin 103 to the oil storage cabin 101. In some embodiments, the crudely-separated oil-water mixture (including the oil phase intercepted by the molecular semi-permeable membrane 201 and part of the water that has not yet passed through the molecular semi-permeable membrane 201) may enter from the bottom inlet of the water suction pipe 202, pass through the entire water suction pipe 202, flow out from the top of the water suction pipe 202, and enter into the oil storage cabin 101.

In some embodiments, the water-absorbing material 203 is disposed inside the water-absorbing pipe 202. In some embodiments, there may be some water in the crudely-separated oil-water mixture. When passing through the water suction pipe 202 arranged in the oil storage cabin 101, the water-absorbing material 203 in the water suction pipe 202 may further absorb a small amount of water phase in the oil-water mixture, and the remaining oil phase enters the oil storage cabin 101.

In some embodiments, the water-absorbing material 203 is polyacrylamide. In other embodiments, the water-absorbing material 203 may also include other materials capable of absorbing water phase, such as sodium hydroxide, calcium chloride, magnesium chloride, copper sulfate, and the like.

In some embodiments, one end of the water suction pipe 202 may be spirally arranged in the oil storage cabin 101. In some other embodiments, the water suction pipe 202 may also include other arrangements such as bending up and down. In some embodiments of the present disclosure, the water suction pipe 202 spirally arranged in the oil storage cabin 101 may increase the path for transporting the oil phase, and better remove water from the oil phase again.

The oil-water collection system 3 may refer to a device for collecting the oil-water mixture on the sea surface. The oil-water collection system 3 may include a first water pump 301, a one-way valve 302, the water pipe 303, etc. For example, the first water pump 301 of the oil-water collection system 3 may use an electric pump, a pneumatic pump, an electromagnetic pump, and a manual pump to collect the oil-water mixture on the sea surface.

In some embodiments, an input end of the first water pump 301 is set outside the storage cabin 1 and located at a sea level, and an output end of the first water pump 301 is connected with the separation cabin 103. The oil-water mixture is delivered to the separation cabin 103 through the first water pump 301, and a certain pressure is provided to the separation cabin 103 at the same time. It is convenient to for the separated oil phase to enter the oil storage cabin 101, and for the water phase to enter the water storage cabin 102 through the molecular semi-permeable membrane 201. The water in the water storage cabin 102 may be discharged through the water pipe 303, realizing the separation of oil and water, and reducing the damage of the oil-water mixture to the marine ecological environment.

In some embodiments, the one-way valve 302 is provided between the first water pump 301 and the separation cabin 103 to prevent the oil-water mixture in the separation cabin 103 from flowing backward. For example, the oil-water collection system 3 starts to work, and the oil-water mixture enters a liquid transport pipe through the first water pump 301, and enters the separation cabin 103 of the oil-water separation system 2 through the one-way valve 302 connected to the bottom of the liquid transport pipe. By disposing the one-way valve 302, after the oil-water mixture is fully stored in the separation cabin 103, the oil-water mixture is prevented from flowing backward due to pressure.

In some embodiments, the sea surface oil recovery device further includes a power system 4. The power system 4 is used to provide power to the sea surface oil recovery device. For example, the power system 4 may provide the movable power for the sea surface oil recovery device, and may also provide the working power for the first water pump 301.

In some embodiments, the power system 4 includes a second water pump 401 arranged on the storage cabin 1, a rudder 402, a water outlet, and a water pipe 303. The second water pump 401 is fixed in the water storage cabin 102, the input end of the second water pump 401 is connected to the water storage cabin 102, the output end of the second water pump 401 is connected with the water pipe 303, and the other end of the water pipe is arranged outside the storage cabin 1.

In some embodiments, by setting the power system 4 on the storage cabin 1, the power system 4 extracts the separated water phase in the water storage cabin 102 as the power source for the second water pump 401, and can control the displacement of the storage cabin 1, so as to facilitate the collection of the oil-water mixture.

In some embodiments, the power system 4 further includes a rudder 402 hinged on the storage cabin 1, and the storage cabin 1 is provided with a control mechanism 403 for controlling the deflection of the rudder 402. The control mechanism 403 may include a connecting rod and a cylinder. An extension end of the cylinder is hinged with the connecting rod, the other end of the connecting rod is hinged with the rudder 402. The rudder 402 is controlled to swing by the control mechanism 403, so as to better change the displacement direction of the storage cabin 1 and improve recovery efficiency.

In some embodiments, when the sea surface oil recovery device is working, first the oil-water collection system 3 starts to work, the oil-water mixture enters the liquid transport pipe through the first water pump 301, and enters the separation cabin 103 of the oil-water separation system 2 through the one-way valve 302 connected at the bottom of the liquid transport pipe. The one-way valve 302 may prevent the oil-water mixture in the separation cabin 103 from flowing backward. The bottom of the separation cabin 103 is connected with the molecular semipermeable membrane 201, and a small opening on the top of the separation cabin 103 leads to the water suction pipe 202. After the oil-water mixture enters the separation cabin 103, due to the density, the oil phase may cover the top of the water phase, and due to the influence of gravity and the effect of the molecular semipermeable membrane 201, the lower water phase may pass through the molecular semipermeable membrane 201 and enter the water storage cabin 102, and the oil phase may be intercepted by the molecular semipermeable membrane 201. The first water pump 301 continuously delivers the oil-water mixture to the separation cabin 103, which is equivalent to continuously pressurizing the separation cabin 103. Due to the influence of the pressure, the oil phase above may enter the water suction pipe 202. The water suction pipe 202 is filled with highly water-absorbent polyacrylamide material to separate a small amount of water phase mixed in the oil phase entering the pipe. When the oil phase passes through the entire water suction pipe 202 and enters the interior of the oil storage cabin 101, the internal pressure of the oil storage cabin 101 continues to rise. When reaching a setting value of the pressure reducing valve 6, the pressure in the oil storage cabin 101 is discharged, and at the same time, the oil phase entering the oil storage cabin 101 is an oil phase in the oil-water mixture through crude separation. The second water pump 401 inside the water storage cabin 102 may discharge the separated water phase from the recovery device and provide power for the recovery device at the same time. The rudder 402 which is set facing the water outlet may change the direction of the power, so the recovery device may realize the dynamic recovery of oil on the sea surface. The gas storage cabin 104 arranged above the recovery device is in a sealed state, and there is no material exchange with each part of the recovery device. After the liquid level sensor 5 detects that the collected oil phase reaches the threshold value, the recovery device may stop the work of collecting the oil on the sea surface. At this time, the gas storage cabin 104 may play a role and store gas. The gas stored in the gas cabin 104 may ensure that the recovery device still has enough buoyancy to prevent the recovery device from sinking into the sea after collecting a large amount of oil, and the gas storage cabin 104 may also ensure that the recovery device floats on the sea surface during the collection process, and the first water pump 301 may absorb oil-water mixtures.

Figure 3:
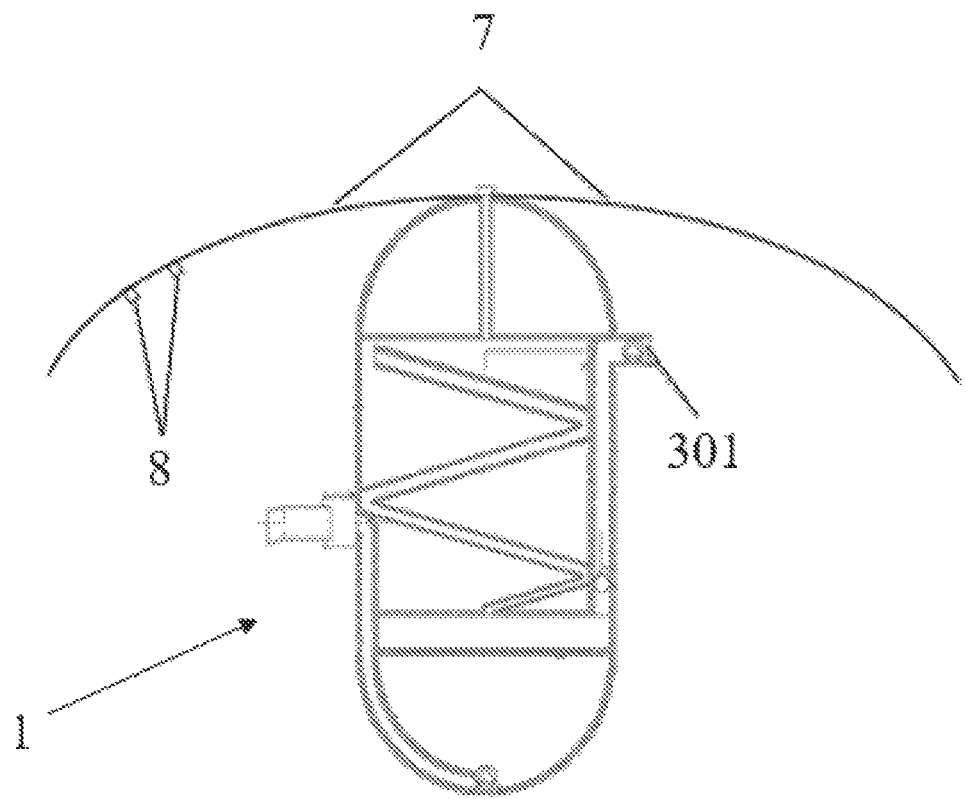
FIG. 3 is a schematic diagram of a cover on the sea surface oil recovery device according to some embodiments of the present disclosure.
Figure 4:
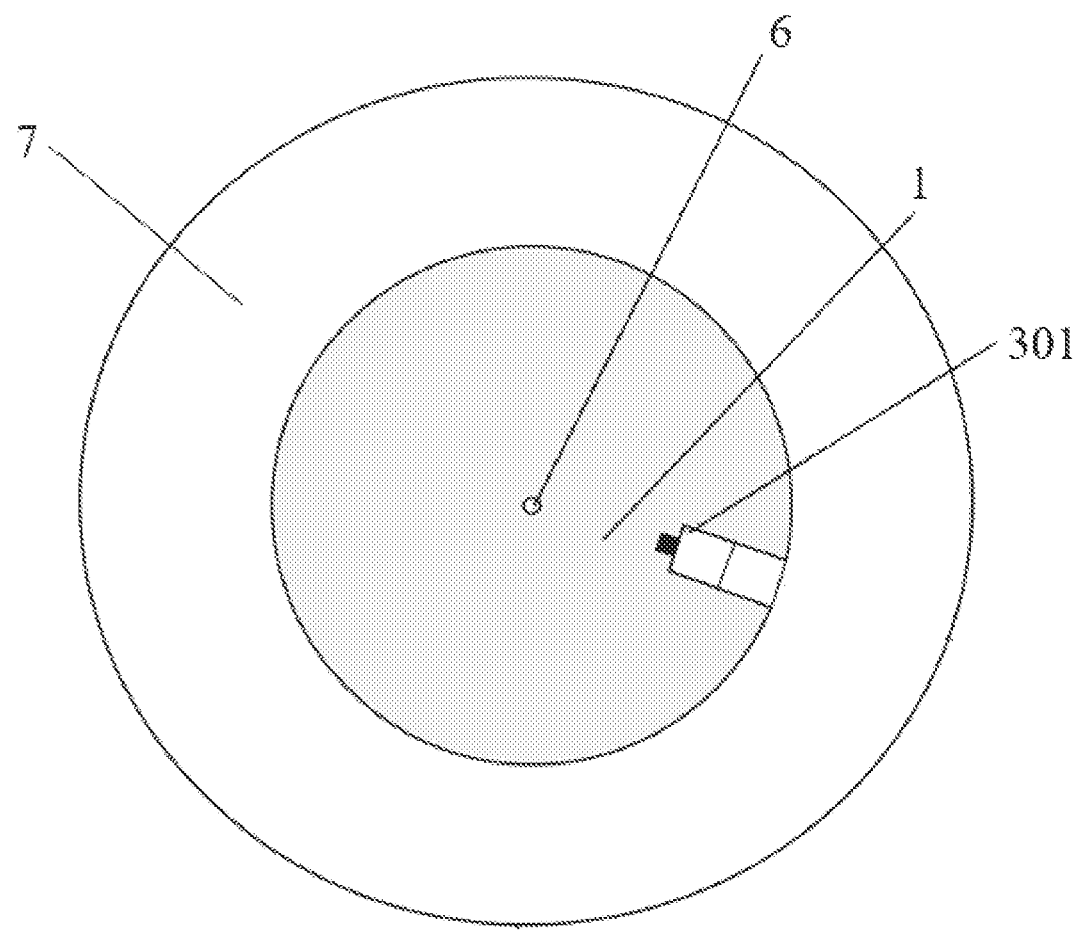
FIG. 4 is a top view of the sea surface oil recovery device when it is working according to some embodiments of the present disclosure.

FIG. 3 is a schematic diagram of a cover 7 on the sea surface oil recovery device according to some embodiments of the present disclosure. FIG. 4 is a top view of the sea surface oil recovery device when it is working according to some embodiments of the present disclosure.

In some embodiments, as shown in FIG. 3 and FIG. 4, the sea surface oil recovery device may further include a cover 7, the cover 7 is arranged outside the storage cabin 1 through the connecting mechanism 9, the cover 7 is located above the storage cabin 1 to cover the storage cabin 1. In some embodiments, the edge of the cover 7 may be in contact with the sea surface so as to cover part of the sea surface. What's more, the cover 7 may cover the oil on the covered sea surface, so as to prevent the oil from being blown away by the wind during recovery, and the cover 7 may block part of the wind and effectively reduce the shaking degree of the sea surface oil recovery device on the sea surface.

Figure 5:
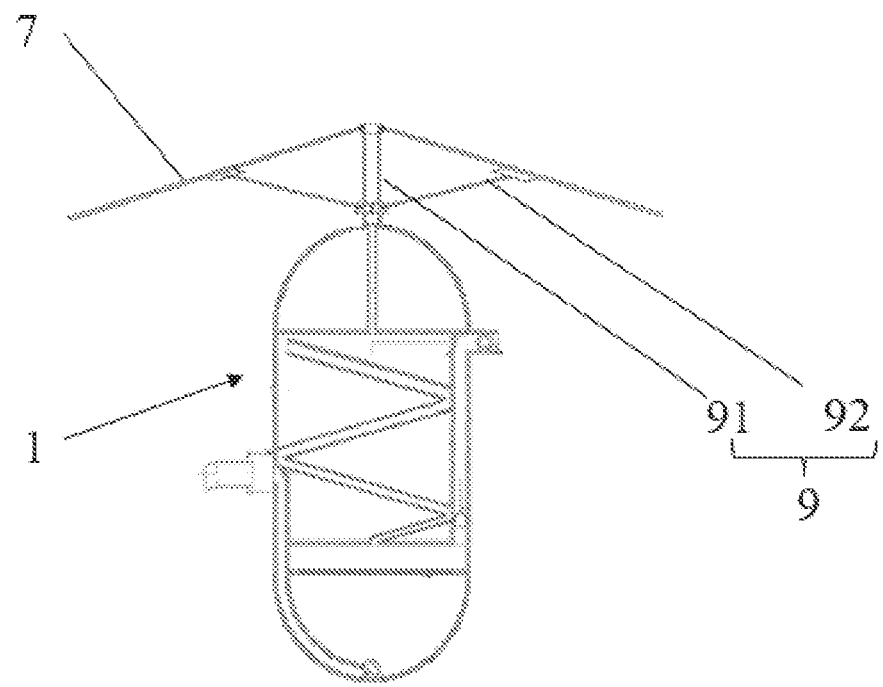
FIG. 5 is a schematic diagram of cover connected with the sea surface oil recovery device according to some embodiments of the present disclosure.

FIG. 5 is a schematic diagram of the cover connected to the sea surface oil recovery device according to some embodiments of the present disclosure.

In some embodiments, the connecting mechanism 9 includes a plurality of movably connected connecting rods with adjustable lengths. The cover 7 is connected to the storage cabin 1 through a plurality of connecting mechanisms 9, and the covering area of the cover is adjusted by synchronously adjusting a plurality of connecting mechanisms 9.

Exemplarily, as shown in FIG. 5, the connecting mechanism 9 may include a telescopic connecting column 91 and a plurality of telescopic connecting levers 92. In some embodiments, one end of the connecting column 91 is connected to the top of the storage cabin 1, the other end is connected to the bottom of the cover 7, and the connecting column 91 may be connected to a position near the center of the cover 7; one end of each of the connecting levers 92 is connected to the connecting column 91, the other end is connected to the cover 7. The connecting column 91, the plurality of connecting levers 92 and the cover 7 may form a structure similar to an umbrella. The height of the cover 7 relative to the sea level can be adjusted by adjusting the expansion and contraction of the connecting column 91. By synchronously adjusting the expansion and contraction of the plurality of connecting levers 92 and the angles between the connecting levers 92 and the connecting column 91, the covering area on the sea surface of the cover 7 may be adjusted.

In other embodiments, the connecting mechanism 9 may include a plurality of telescopic connecting rods, one end of each of which is movably connected to a side wall of the storage cabin 1, and the other end is connected to the cover 7. By synchronously adjusting the expansion and contraction of the connecting rods and their angles with the side wall of the storage cabin 1, the area of the sea surface covered by the cover 7 may be adjusted.

In some embodiments, as shown in FIG. 3, a blowing device 8 is provided under the cover 7, and the wind blown by the blowing device 8 may be used to gather oil on the sea surface. In some embodiments of the present disclosure, the blowing device 8 may gather the oil on the sea surface to the vicinity of the first water pump 301 by blowing air, so as to improve recovery efficiency.

In some embodiments, an image collector is arranged on the top of the cover 7 for obtaining sea surface images.

In some embodiments, the cover 7 and its connecting mechanism 9 may not cover the pressure reducing valve 6. When the sea surface oil recovery device is working, the cover 7 may not affect the pressure reducing valve 6 to perform gas exhaust and pressure reduction.

In some embodiments, the sea surface oil recovery device may also include a control mechanism 403; the control mechanism 403 may include a controller, and the controller may be used to determine a parameter of the connecting mechanism 9, a blowing parameter of the blowing device 8, and the operating power of the second water pump 401.

In some embodiments, the controller may communicate with the image collector; the controller may use the sea surface images obtained by the image collector to determine the oil distribution parameters of the sea surface, and determine the parameter of the connecting mechanism 9 based on the oil distribution parameters. In some embodiments, the oil distribution parameters may be determined by analyzing and processing the sea surface images, for example, identifying the sea surface images to determine the oil distribution parameters of the sea surface. In some embodiments, the oil distribution parameters of the sea surface may be represented by an oil distribution diagram. In some embodiments, the controller may determine the area of the sea surface covered by the cover 7 based on the oil distribution parameters of the sea surface, and determine the parameter of the connecting mechanism 9 based on the area of the sea surface covered by the cover 7. The relationship between the parameter of the connecting mechanism 9 and the area of the cover 7 covering the sea surface may be preset. In some embodiments, the parameter of the connecting mechanism 9 may include the length of the connecting column 91, the length and angle of each of the connecting lever 92, and the like.

In some embodiments, the controller may be further used to identify the sea surface images through a recognition model, and output the oil distribution parameters. The oil distribution parameters include the oil distribution diagram, and the oil distribution diagram includes nodes and edges, and the nodes represent oil regions in the sea surface covered by cover 7, the edges represent the existence of adjacent relationship, that is, two nodes are connected by an edge if the two oil regions belong to the adjacent relation. A value of each node represents an area of the oil region, and a value of each edge represents the distance of two adjacent oil regions. For example, the value of the edge may be the shortest distance between two oil regions.

In some embodiments, the recognition model may be a machine learning model. For example, the recognition model may include a Convolutional Neural Network model (CNN), a Recurrent Neural Network model (RNN), a Deep Neural Networks model (DNN), etc. or any combination thereof. In some embodiments, the input to the recognition model may include sea surface images, and its output may include oil distribution diagrams.

In some embodiments, the training samples for training the recognition model may be obtained based on historical data, and the label is a historical oil distribution diagram.

In some embodiments, the training samples are input into the initial recognition model to obtain the oil distribution diagram output by the initial recognition model. Based on the number of historical nodes and edges, the value of each historical node, the value of each historical edge of the historical oil distribution diagram, as well as the number of nodes and edges, the value of each node, the value of each edge of the oil distribution diagram output by the initial recognition model, a loss function is constructed, and the initial recognition model is updated based on the loss function until the loss function satisfies a preset requirement, e.g., the loss function is less than a threshold, converges, or the training cycle reaches the threshold, and a trained recognition model is obtained.

In some embodiments, the controller may determine the area of the sea surface covered by the cover 7 based on the preset rules and the oil distribution diagram output by the recognition model, for example, if the area of the oil region in the middle of the oil distribution diagram is larger than a threshold, the area enlarged by a preset number may be used as the area of the sea surface covered by the cover 7. For another example, if the area of the oil region in the middle of the oil distribution diagram is smaller than the threshold, and the distances of the oil region from other regions are smaller than a threshold, the surrounding preset number of oil regions may be obtained to finally determine the area of the sea surface covered by the cover 7. In some embodiments, based on the finally determined area of the sea surface covered by the cover 7 and the preset correspondence between the area of the sea surface covered by the cover 7 and the parameter of the connecting mechanism 9, the controller may determine the parameter of the connecting mechanism 9 and configure it on the cover 7, so that the cover 7 can be opened as required to cover the required area of the sea surface.

In some embodiments, the controller may communicate with the blowing device 8; the controller may be used to determine the blowing parameters of multiple blowing devices 8 based on the oil distribution parameter and the positions of the blowing devices 8.

In some embodiments, a plurality of blowing devices 8 may be arranged on the cover 7, and the plurality of blowing devices 8 may be evenly spaced. In some embodiments, the plurality of blowing devices 8 and their positions may be represented in a matrix form, that is, a position matrix, and each element of the position matrix represents the position of each blowing device. In some embodiments, the actual position of each blowing device may be used to determine the element position of the blowing device in the position matrix. In some embodiments, the controller may determine the blowing parameter of each blowing device 8 based on processing the oil distribution diagram and the position matrix of the blowing devices 8. In some embodiments, the blowing parameter may include blowing power. In some embodiments, only the blowing powers of the multiple blowing devices 8 are different, and the others are identical.

In some embodiments, the controller may be further used to determine a plurality of blowing parameters by an aggregation model and multiple rounds of iterations. At least one round of iterations includes: based on the aggregation model, processing the multiple blowing parameters determined in the previous round and an aggregation distribution diagram output in the previous round, outputting the aggregation distribution diagram after the preset time; and based on the difference between the aggregation distribution diagram output after the preset time and the aggregation distribution diagram output in the previous round, adjusting multiple blowing parameters in the previous round; when the maximum aggregation area in the output aggregation distribution diagram after the preset time is greater than a preset threshold, the iteration ends. In some embodiments, for the first round, the blowing parameter matrix determined in the previous round corresponds to the initial blowing parameter matrix, wherein the elements in the initial blowing parameter matrix represent the initial blowing parameters of each blowing device. The initial blowing parameters of each blowing device 8 may be preset. The aggregation distribution diagram output by the aggregation model after the preset time in this round is used as the "aggregation distribution diagram output in the previous round" of the next round for the next round of iteration.

In some embodiments, the aggregation distribution diagram is an oil distribution diagram corresponding to the aggregation of oil during the operation of the blowing devices 8. In some embodiments, for the first round, the aggregation distribution diagram output in the previous round is the oil distribution diagram output by the recognition model.

In some embodiments, the controller may determine the adjustments to the blowing parameters of the plurality of blowing devices 8 based on the amount of reduction in the number of nodes of the aggregation distribution diagram and the value of distance reduction. For example, if the distance (that is, the edge) of the aggregation distribution diagram becomes longer, the controller may increase the blowing power of the surrounding blowing devices 8. For another example, if the distance (i.e., edge) of the aggregation distribution diagram is reduced and the number of nodes is decreased, but the amount of reduction and decrease is less than threshold values, respectively, then the controller may adjust the blowing power of the preset number of the blowing devices 8 in the middle. The adjustment amplitude of the blowing powers may be preset. In some embodiments, both the node threshold and the distance threshold may be manually set.

Figure 6:
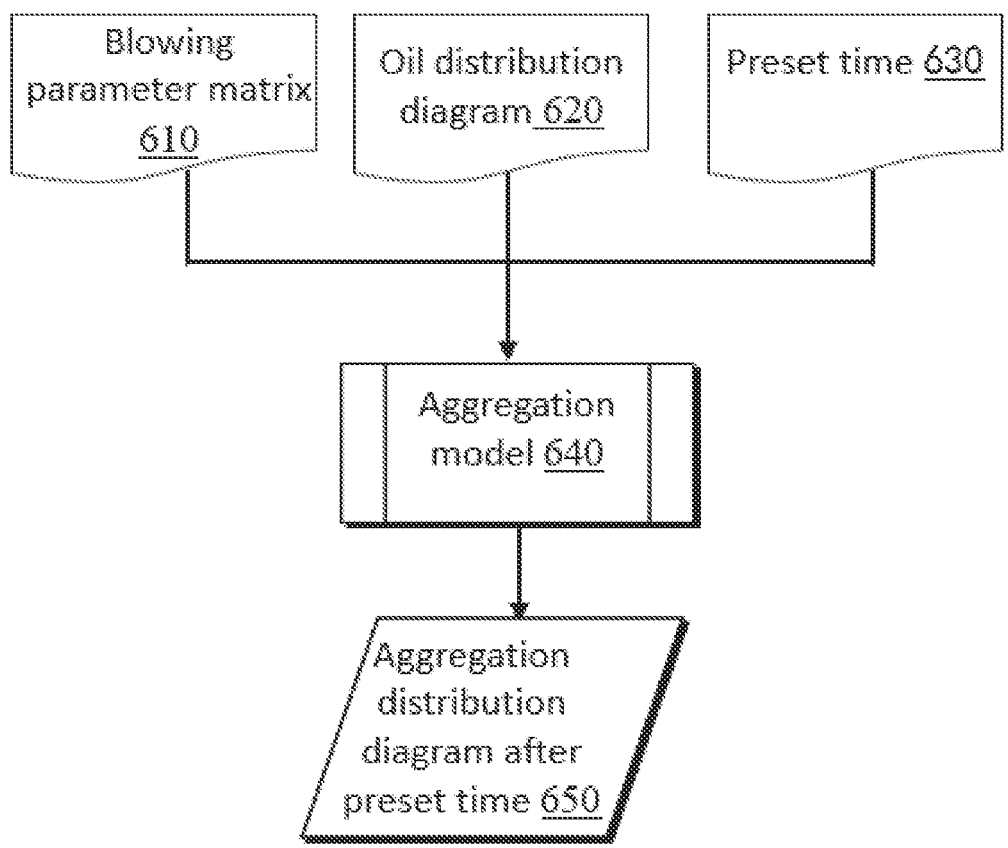
FIG. 6 is a schematic diagram of an aggregation model according to some embodiments of the present disclosure.

FIG. 6 is a schematic diagram of an aggregation model according to some embodiments of the present disclosure.

The aggregation model is a model used to determine the aggregation distribution diagram at a preset time. In some embodiments, the aggregation model may be a machine learning model. For example, the aggregation model may include a Convolutional Neural Network model (CNN), a Recurrent Neural Network model (RNN), a Deep Neural Networks model (DNN), etc. or any combination thereof.

In some embodiments, as shown in FIG. 6, the input of the aggregation model 640 may include blowing parameter matrix 610, oil distribution diagram 620 and preset time 630 (for example, 1 minute), and the output may include aggregation distribution diagram after preset time 650 (e.g., aggregation distribution diagram after 1 minute). In some embodiments, the controller may set the preset time based on the aggregation effect of a plurality of blowing devices 8 with the blowing parameter matrix after a variety of preset times, for example, 1 minute, 5 minutes, 1 to 5 minutes, etc. may be preset.

In some embodiments, the training samples may include historical data, and the labels are historically collected aggregation distribution diagrams.

In some embodiments, the training samples are input into the initial aggregation model, and the aggregation distribution diagram output by the initial aggregation model at a preset time is obtained. A loss function is constructed based on the aggregation distribution diagram collected historically and the aggregation distribution diagram at the preset time output by the initial aggregation model. The loss term contained in the loss function may be the difference between the aggregation distribution diagram at the preset time output by the initial aggregation model and the aggregation distribution diagram collected historically during training. Based on the loss function, the initial aggregation model is updated until the preset requirements such as the loss function is less than a threshold, convergence, or the training cycle reaches the threshold are met, and the trained aggregation model is obtained.

In some embodiments, the controller may determine the operating power of the second water pump 401 in the subsequent recovery process through the corresponding aggregation distribution diagram and the covering area of the cover 7 when the recovery device finishes recovery at a certain recovery position. In some embodiments, the operating power of the second water pump 401 may be positively correlated with the maximum aggregation area in the aggregation distribution diagram and the area of the cover 7. In some embodiments, when the cover 7 is opened and the first water pump 301 is running, if the device does not need to move, the second water pump 401 may pump water in the water storage cabin 102 at a lower power (preset) out of the recovery device; if the first water pump 301 finishes working and the recovery device needs to go to the next recovery point, then the second water pump 401 adjusts the operating power of second water pump 401 according to the maximum aggregation area and the area of the cover 7 in the aggregation distribution diagram to enter the next recovery point.

In some embodiments, the controller may preset corresponding weights based on the area of the largest oil aggregation area in the aggregation distribution diagram and the covering area of the cover 7, and determine the operating power of the second water pump 401 through the conversion factor.

In some embodiments, when the second water pump 401 starts to work, the water phase in the water storage cabin 102 is transported to the liquid outlet of the storage cabin through the water pipe 303, and the separated water phase is discharged from the recovery device while providing the recovery device with power to move forward; the control mechanism 403 controls the rudder 402 to work, and the movement direction of the recovery device may change.

In some embodiments, the second water pump 401 may discharge the separated water phase from the recovery device while providing power for the recovery device, and at the same time, the rudder 402 that is arranged at the water outlet may change the direction of the recovery device, so the recovery device may realize dynamic recovery of the oil on the sea surface.

In some embodiments, the sea surface oil recovery device first moves to a specific recovery position based on remote control, and the image collector on the cover 7 starts to work to obtain the sea surface images, that is, to obtain the oil distribution in the current sea surface image; then the controller of the recovery device may determine the parameter of the connecting mechanism 9 of the cover 7 based on the oil distribution of the current sea surface image, and adjust it based on the determined parameters. During this process, the edge of the cover 7 may contact the sea surface or partially enter the water, so that the cover 7 covers the oil to be recovered; then the controller starts a plurality of blowing devices 8 on the cover 7, so that the oil to be recovered covered by the cover 7 aggregates near the first water pump 301; the first water pump 301 start to work, during this process, the plurality of blowing devices 8 still keep working; when the image collected by the image collector shows that the oil in the cover 7 are all recovered, the controller controls the first water pump 301 to stop working, and according to the final aggregation distribution diagram and the covering area of the cover 7, the operating power of the second water pump 401 in the subsequent acquisition process is determined and executed; the cover 7 is folded, and the recovery device enters the next recovery position.

In some embodiments, by setting the cover 7 and the image collector, the sea surface with a relatively high proportion of oil may be covered in a targeted manner on the fluctuating sea surface, and at the same time, the oil is prevented from being blown away by the wind during recovery, and because the cover can block part of the wind, which can partially reduce the degree of shaking of the recovery device; the blowing device 8 assists the first water pump 301 to recover the water-oil mixture, which can improve the recovery efficiency of the first water pump 301.

In some embodiments, after the oil-water mixture to be recovered is absorbed into the recovery device through the first water pump 301, the oil-water mixture to be recovered enters the separation cabin 103 through the liquid transport pipe through the one-way valve 302, and the one-way valve 302 can prevent the oil-water mixture from flowing back into the liquid transport pipe. The oil-water mixture continuously enters the separation cabin 103 of the oil-water separation system 2 through the liquid transport pipe. Due to the gravity of water and oil, the water phase penetrates the molecular semipermeable membrane 201 and enters the water storage cabin 102, and the oil phase is intercepted in the separation cabin 103, as the first water pump 301 continues to pump the oil-water mixture into the separation cabin 103, under the action of pressure, the crudely-separated oil-water mixture enters from the bottom inlet of the water suction pipe 202, passes through the entire water suction pipe 202 and is released by the water suction pipe from the top and flows out into the oil storage cabin 101. When the oil storage cabin 101 reaches a certain pressure, the pressure reducing valve 6 is opened to evacuate the internal pressure.

In some embodiments, when the sea surface oil recovery device is in use, it effectively solves the problems of difficult collection of leaked oil on the sea surface, low collection rate, and high manpower consumption, reduces the waste of oil resources, and can realize the dynamic collection of the oil-water mixture and the rough separation of oil and water after the oil-water mixture changes (e.g., diffusion). Since a large amount of oil phase and water phase will be stored in the recovery device after the oil collection work is completed, a gas storage cabin is installed on the top of the recovery device to prevent the recovery device sinks into the sea, and at the same time facilitate the recovery. In some embodiments, on the basis of effectively collecting oil on the sea surface, the recovery device may simultaneously perform crude separation of oil and water, which improves the recovery rate of oil and reduces the burden for subsequent oil-water separation. The sea surface oil recovery device and its use method are very simple, and the recovery of sea surface oil can be realized only by putting the recovery device into the sea.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A sea surface oil recovery device, comprising a storage cabin (1), an oil-water separation system (2), and an oil-water collection system (3), the oil-water separation system (2) and the oil-water collection system (3) being arranged on the storage cabin (1), wherein
   the storage cabin (1) is provided with an oil storage cabin (101), a water storage cabin (102), a separation cabin (103), and a gas storage cabin (104) which are separated from each other, the gas storage cabin (104) is located above the storage cabin (1), the separation cabin (103) is located below the oil storage cabin (101), the separation cabin (103) is located above the water storage cabin (102), and the storage cabin (1) is provided with a water pipe (303) for connecting the water storage cabin (102) with the outside of the storage cabin (1);
   the oil-water separation system (2) includes a molecular semipermeable membrane, (201) for separating oil and water and a water suction pipe (202), the molecular semipermeable membrane (201) is arranged between the separation cabin (103) and the water storage cabin (102) and connects the separation cabin (103) with the water storage cabin (102), the water suction pipe (202) is arranged between the oil storage cabin (101) and the separation cabin (103) and connects the oil storage cabin (101) and the separation cabin (103), and a pressure reducing valve (6) is arranged on the top of the storage cabin (1) and connected to the oil storage cabin (101);
   the oil-water collection system (3) comprises a first water pump (301) arranged on the storage cabin (1), an input end of the first water pump (301) is arranged outside the storage cabin (1) and at a sea level, and an output end of the first water pump (301) is connected to the separation cabin (103); and
   a water-absorbing material (203) is arranged in the water suction pipe (202), the water-absorbing material (203)

is polyacrylamide, and one end of the water suction pipe (202) is spirally arranged in the oil storage cabin (101).

2. The sea surface oil recovery device according to claim 1, further comprising a power system (4), which includes a second water pump (401) arranged on the storage cabin (1), wherein an input end of the second water pump (401) is connected to the water pipe (303), and an output end of the second water pump (401) is arranged outside the storage cabin (1).

3. The sea surface oil recovery device according to claim 2, wherein the power system (4) further comprises a rudder (402) hinged on the storage cabin (1), and the storage cabin (1) is provided with a control mechanism (403) for controlling the deflection of the rudder (402).

4. The sea surface oil recovery device according to claim 1, wherein a one-way valve (302) for preventing an oil-water mixture in the separation cabin (103) from flowing backward is arranged between the first water pump (301) and the separation cabin (103).

5. The sea surface oil recovery device according to claim 1, wherein a liquid level sensor (5) is arranged in the oil storage cabin (101).

* * * * *